June 6, 1961  W. E. FORTMANN  2,986,880
MINIMUM FLOW THROTTLE VALVE FOR A JET ENGINE FUEL CONTROL
Filed Nov. 15, 1957
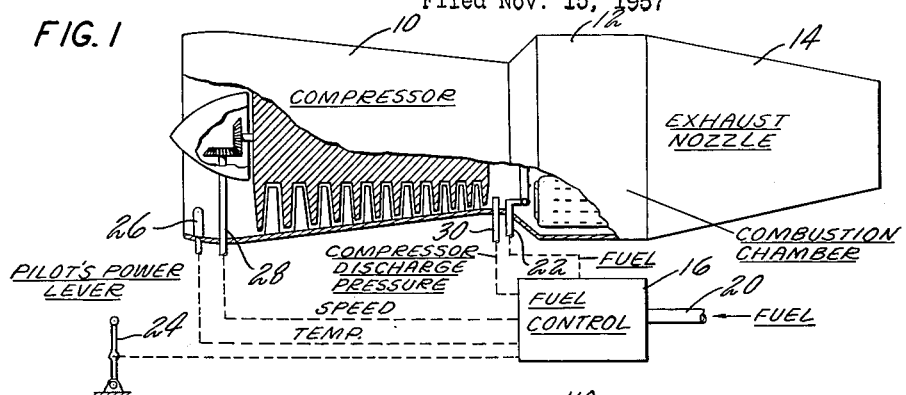
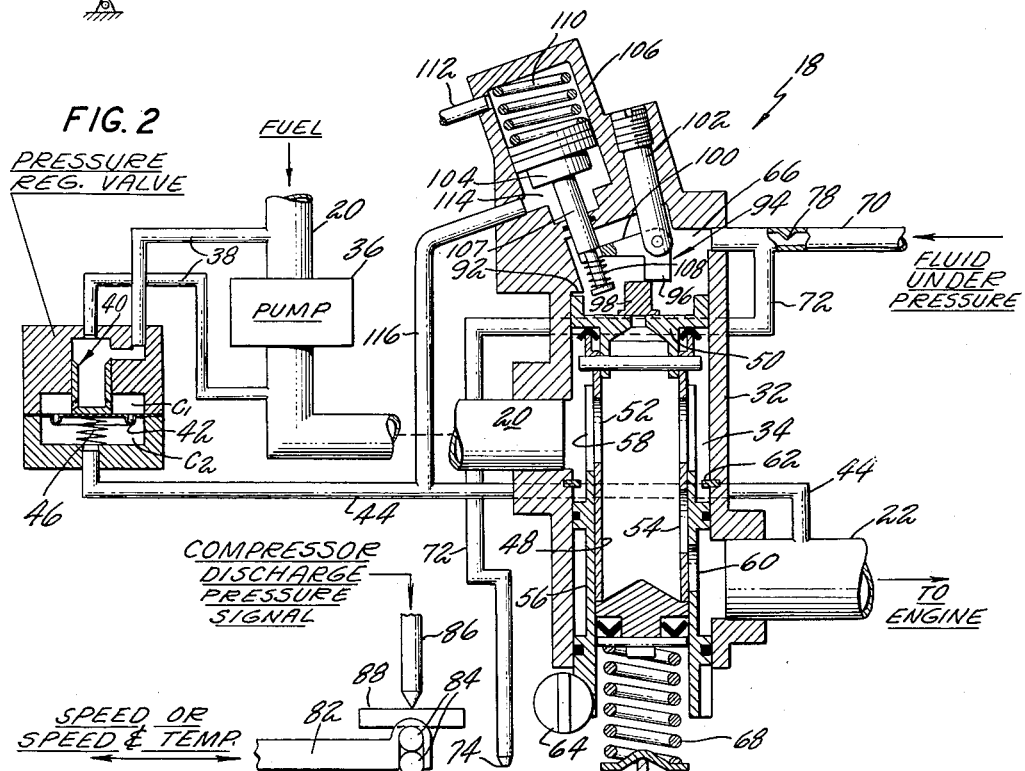
INVENTOR
WILLIAM E. FORTMANN
BY Teller & McCormick
ATTORNEYS

United States Patent Office 2,986,880
Patented June 6, 1961

2,986,880
MINIMUM FLOW THROTTLE VALVE FOR A JET ENGINE FUEL CONTROL
William E. Fortmann, Farmington, Conn., assignor to United Aircraft Corporation, East Hartford, Conn., a corporation of Delaware
Filed Nov. 15, 1957, Ser. No. 696,832
4 Claims. (Cl. 60—39.14)

This invention relates to a fuel control system for a jet engine or the like and, more specifically, to an improved fuel control throttle valve which incorporates means for metering the flow of fuel at preselected different minimum levels to suit specifically different operating conditions.

In the operation of jet engine aircraft, it is desirable to have means for limiting minimum engine speed at high altitude. One means of preventing a reduction in engine speed below a preselected minimum is to provide a fuel valve stop which will maintain a selected minimum fuel flow during engine operation. It is also desirable to provide for even less fuel flow through the valve when the engine is being started.

It is the general object of this invention to provide fuel valve stop means which will impose a limitation on the selection of minimum fuel flow so as to provide for sufficient engine speed during flight and to provide additional stop means which will impose a different limitation and thereby provide for a lower minimum fuel flow for the purpose of starting engine operation.

The drawing shows a preferred embodiment of the invention and such embodiment will de described, but it will be understood that various changes may be made from the construction disclosed, and that the drawing and description are not to be construed as defining or limiting the scope of the invention, the claims forming a part of this specification being relied upon for that purpose.

Of the drawing,

FIG. 1 is a schematic illustration of a jet engine power plant with a schematically indicated fuel control operatively connected thereto;

FIG. 2 is a longitudinal sectional view through a throttle valve provided in accordance with the present invention and forming a part of the fuel control, and FIG. 2 also schematically illustrates a pressure regulating valve and fuel pump which may form a part of the aforesaid fuel control; and FIG. 3 is a fragmentary longitudinal sectional view of the throttle valve showing a position thereof different from that illustrated in FIG. 2.

The jet engine power plant shown in FIG. 1 for purposes of illustration comprises a compressor 10, a combustion chamber 12 and an exhaust nozzle 14, and the jet engine may be considered as conventional in contemplation of the present invention which relates to an improved throttle valve construction forming a part of the fuel control or fuel control system indicated generally at 16 in FIG. 1. The improved throttle valve construction is incorporated in a valve assembly 18 (FIG. 2) which is connected with a fuel inlet or supply conduit 20 and with a conduit 22 through which the fuel passes from the fuel control 16 to the combustion chamber 12 of the engine. In a presently preferred form, the throttle valve assembly 18 is adapted to be actuated by fluid pressure. That is, no mechanical control element, such as a pilot's power lever or control lever 24 (FIG. 1), is directly connected with the throttle valve in the assembly 18 so as to move the throttle valve. Instead, the pilot's control lever 24 operates other mechanism which influences and controls the valve actuating pressure.

In addition to power lever setting, the preferred throttle valve is adapted to be influenced by parameters of power plant or engine operation such as the inlet temperature at the compressor 10, the compressor discharge pressure, and the compressor or engine speed. As shown in FIG. 1, a temperature sensing element 26 is provided at the compressor inlet to transmit a signal to the fuel control 16 which is responsive to and in keeping with the compressor inlet temperature. A speed signal is transmitted to the fuel control 16 by means of a shaft 28 which is driven by the compressor, and a pressure signal is transmitted to the fuel control through a conduit 30 extending from the discharge end of the compressor 10.

While not part of the present invention, it should be explained that suitable means are incorporated in the fuel control or fuel control system 16 to translate the temperature, speed and pressure signals from the jet engine into mechanical forces which operate valve means provided to control the actuating pressure in the throttle valve assembly 18. Means is also provided within the fuel control or fuel control system 16 to coordinate the said temperature, speed and pressure signals and their resulting forces with the mechanical force provided by operation of the pilot's control or power lever 24 in operation of the supplemental valve means which controls the throttle valve actuating pressure. The said coordinating means will be described briefly in connection with the following description of the throttle valve assembly 18 which has specific reference to FIGS. 2 and 3.

The throttle valve assembly includes a housing 32 having a bore 34 wherein the throttle valve is movable. The housing 32 is connected with the fuel inlet or supply conduit 20 and with the conduit 22 which passes the fuel to the combustion chamber of the jet engine, the connection of the housing with the said conduits being such that the fuel passes through the bore 34 of the housing wherein it encounters the throttle valve which controls the flow. As will be described in greater detail hereinafter, the throttle valve which is disposed for movement within the bore 34 is provided with suitable ports or windows, and movement or adjustment of the throttle valve causes a change in the effective size of the said ports. If the quantity or volume of fuel flow is to be controlled by controlling the effective area of a valve port or ports within the bore 34, it will be readily understood that means must be provided to control the pressure drop in the bore 34 or the pressure drop or differential between the inlet conduit 20 and the engine fuel feed conduit 22.

One suitable means for controlling the pressure drop in the throttle valve assembly 18 includes a pump 36 disposed in the fuel inlet conduit 20 and having a recirculating conduit 38 wherein a pressure regulating valve 40 is disposed. The valve 40 is moved or adjusted to open or to close or to partially open the recirculating line 38 by means of a diaphragm 42 which is secured within a suitable housing which defines a chamber on each side of the diaphragm. One chamber C1 communicates with the recirculating line 38 so as to be subjected to the pressure at the inlet to the throttle valve housing bore which pressure acts upon the diaphragm 42 to open the by-pass valve 40. The other chamber C2 is connected as by conduit means 44 with the engine fuel feed conduit 22 so as to be subjected to fuel at the engine feed pressure at the discharge of the throttle valve housing bore 34. The pressure within the chamber C2 acts upon the diaphragm 42 to close the valve 40, and a spring 46 is disposed within the chamber C2 also to bias the valve 40 toward closed position. Thus, if the discharge pressure at the throttle valve housing increases without a corresponding increase in the inlet pressure at the valve housing, the pressure regulating valve 40 will be moved toward closed position to reduce the recirculating flow and thus to increase the inlet pressure at the throttle valve housing. In like manner, if there is a decrease inthe discharge pressure at the throttle valve housing without a corresponding decrease in the inlet pressure at the throttle valve housing, the pressure regulating valve 40 will be opened to increase the pump by-pass flow and thereby to decrease the inlet pressure at the throttle valve housing. Accordingly, a substantially constant fuel pressure drop or fuel pressure differential is maintained in flow through the bore 34 of the throttle valve housing 32.

The throttle valve per se is designated by the reference numeral 48 and comprises a preferably cylindrical hollow member which is movable longitudinally in the bore 34 of the housing 32 and is thus movable generally transversely of the fuel conduits 20 and 22. As shown in the drawing, the upper end of the throttle valve is connected with a piston 50 which engages the wall of the bore 34 for reciprocation therein. One or more windows or ports 52 is provided in the hollow cylindrical throttle valve 48 for free communication with the open end of the fuel inlet conduit 20. A discharge window or port 54 is provided in the throttle valve 48 in axially or longitudinally spaced relationship with the inlet port or window 52.

A valve sleeve 56 surrounds the throttle valve 48 below the throttle valve piston 50 and the said sleeve is provided with one or more window openings or ports 58 which are associated with the inlet port or ports 52 on the throttle valve so that in all positions of the throttle valve and sleeve free communication is provided between the fuel inlet conduit 20 and the hollow interior of the throttle valve. The sleeve 56 is also provided with a window or port 60 which is associated with the discharge window or port 54 of the throttle valve so as to provide communication between the interior of the throttle valve and the discharge or engine fuel feed conduit 22. The sleeve 56 has piston-like flanges engaging the wall of the throttle valve housing bore 34 to permit movement of the sleeve within the housing. Such movement or adjustment of the sleeve 56 within the throttle valve housing can be either axial (longitudinally of the bore) or rotational. Preferably, the movement or adjustment of the sleeve 56 within the bore 34 is longitudinal and is limited in one direction by engagement of the sleeve against a stop ring 62 disposed in the wall of the bore 34. Such movement or adjustment of the sleeve causes relative movement between the valve discharge port 54 and the sleeve discharge port 60 whereby to adjust the effective flow opening therethrough. The movement or adjustment of the sleeve constitutes a course adjustment of the flow opening and, preferably, such adjustment is effected only occasionally and then by some manually operable means such as that indicated by the reference numeral 64. After adjustment of the sleeve 56, it will remain in adjusted position until further deliberate movement thereof is made.

The in-flight control of fuel flow is effected by longitudinal movement of the throttle valve 48 within the sleeve 56 so as to adjust the area of communication between the port 54 in the throttle and the port 60 in the sleeve. As previously mentioned, throttle valve operation is effected by fluid pressure. More specifically, longitudinal movement of the throttle valve 48 is effected in the throttle valve assembly by changing the pressure in a chamber 66 defined within the bore and acting upon the throttle valve piston 50. The throttle valve is biased in opposition to the fluid pressure thereon by spring means indicated at 68 which engage the bottom of the throttle valve. Thus, the throttle valve piston and the throttle valve can be reciprocated within the throttle valve housing bore 34 by increasing and decreasing the fluid pressure within the chamber 66.

Fluid is introduced to the chamber 66 through a conduit 70 which can be connected to a suitable fluid pressure source. A conduit 72 is connected to the conduit 70 adjacent the valve actuating chamber 66, and the conduit 72 is provided with a discharge nozzle 74 whose effective opening can be varied by movement of a pivoted flap valve 76 whereby to control the operating pressure in the throttle valve chamber 66. A restriction 78 is placed in the conduit 70 upstream of the connection with the conduit 72 so that opening and closing of the nozzle 74 will effect an immediately felt pressure change in the throttle valve actuating chamber 66.

As previously mentioned, the temperature, speed and pressure signals from the jet engine and the pilot's power lever movements or signals are translated into mechanical forces applied to valve means for controlling pressure in the throttle valve assembly. The said valve means has now been identified as the valve 76 which comprises a flap valve supported for pivoting movement about a point 80 so as to open and to close and to control the effective area of the throttle chamber discharge orifice 74. The speed and temperature signals and the pilot's power lever movement are translated into forces within the fuel control 16 moving an arm 82 which carries rollers 84 movable along the lever-like flap valve 76. The compressor discharge pressure signal is translated into a force biasing a plunger 86 downwardly upon a plate 88 which is disposed over the rollers 84. Thus, the speed, temperature and power lever signals change the moment arm of the force applied to the flap valve 76 and the compressor discharge pressure signals control the amount of the said force.

In the specific arrangement shown for purposes of illustration, if the pilot moves the power lever to increase fuel flow or if the speed and/or temperature conditions call for increased fuel flow, the arm 82 and rollers 84 are moved toward the left in FIG. 2 whereby the applied force causes counter-clockwise movement of the flap valve to restrict the effective opening of the orifice 74 whereby to increase the throttle valve actuating pressure in the chamber 66 and to move the throttle valve 48 downwardly. Downward movement of the throttle valve 48 will increase the area of communication between the throttle valve port 54 and the sleeve port 60 to accommodate greater flow through the throttle valve. Likewise, if the compressor discharge pressure signal dictates a requirement for more fuel flow, increased force will be applied through the plunger 86 to cause counterclockwise movement of the flap valve 76 and downward movement of the throttle valve 48. If, on the other hand, less fuel flow is called for, the arm 82 may be moved to the right or the force on the plunger 86 may be decreased to cause clockwise rotation or pivoting movement of the flap valve 76, thereby increasing the effective opening at the orifice 74 and reducing throttle valve actuating pressure in the chamber 66 whereby the spring means 68 will thrust the throttle valve 48 upwardly. This, of course, restricts the effective area or communicating opening between the throttle valve port 54 and the valve sleeve port 60.

It should be observed that the pressure controlling flap valve 76 has an extending end which is connected with the spring means 68 for the throttle valve. Thus, there is provided a feedback for the said flap valve. That is, if the throttle valve is thrust downwardly due to increased pressure, the spring means 68 will carry the flap valve 76 with it in an orifice opening direction, but the spring force will tend to return the flap valve in the orifice closing direction. It should also be observed that an adjustable seat 90 is provided for the spring means 68 whereby to provide for adjustment of the spring force and selection of the throttle valve operating pressure.

As described above, downward movement of the throttle valve 48 increases the effective port opening and increases fuel flow through the throttle valve while upward movement of the throttle valve reduces or limits the fuel flow. In keeping with an important object of the invention, a first stop is provided to limit the upward or flow-restricting movement of the throttle valve to a position wherein a minimum flow is established sufficient to start operation of the engine but wherein fuel flow is less than that desired to maintain a minimum engine speed. The said first stop means comprises a stop shoulder 92 provided in the bore of the housing 32 to engage the throttle valve piston 50. The throttle valve piston 50 is shown engaged with the stop shoulder 92 in FIG. 3. In said position of the piston, the effective area of the opening provided between the throttle valve port 54 and the sleeve port 60 is at a minimum which will provide for engine starting fuel flow. The sleeve 60 must be preadjusted to provide the desired minimum flow opening when the throttle valve piston engages the shoulder. The said shoulder 92 constitutes a fixed stop which is engaged by the throttle valve only when the engine is not operating and after the power lever 24 has been completely retarded to the "off" position. During engine operation, a second stop engages the throttle valve to provide for a higher minimum fuel flow.

As will be more fully explained, the said second stop is arranged for movement into and out of operating position and it is urged into operating position by fuel pressure in the engine fuel supply conduit 22. Thus, whenever engine operation is established and the temperature, pressure and speed parameters thereof open the throttle valve for fuel flow in excess of the "high" minimum flow, the pressure of such flow will automatically position the second stop to maintain flow at the said high minimum whereby to impose a minimum on engine operating speed.

The said second stop comprises the member 94 shaped like a bell crank having one arm 96 which is engageable with a projection 98 on the throttle valve piston 50 and another arm 100 engaged and movable by pressure responsive means. The stop member 94 is pivotally supported between its arms 96 and 100 on support means 102 adjustably secured in the throttle valve housing 32 whereby the stop member is disposed within the throttle valve actuating chamber 66 so that when it is pivoted to operating position its arm 96 will be engaged by the projection 98 on the throttle valve piston 50 before the said throttle valve piston engages the fixed stop shoulder 92 during its upward or flow-limiting movement. The pressure responsive means which pivots the stop member 94 into and out of operating position comprises a piston 104 movable within a suitable cylinder 106 defined in the throttle valve housing 32. A rod or extension 107 on the piston 104 is engaged by the bifurcated end of the arm 100 of the stop member 94 and a spring 108 is supported by the piston 104 to maintain engagement between the said rod and the stop arm 100. A spring 110 is disposed in the cylinder 106 to urge the piston 104 in a direction which will pivot the stop member 94 out of operating position. The cylinder chamber wherein the spring 110 is disposed is vented as by a vent conduit 112 to atmosphere or to the boost pressure provided within the fuel control 16. The force of the spring on the piston 104 is opposed by fluid pressure in a chamber 114 defined within the cylinder 106, which fluid pressure biases the piston 104 to pivot the stop member 94 into operating position. The fluid pressure in the chamber 114 is provided through a conduit 116 which is connected with the conduit 44 extending to the engine fuel feed conduit 22. Thus, engine fuel pressure tends to maintain the stop member 94 in operating position whereby to fix minimum fuel flow at a level which will avoid engine failure during flight. There will be sufficient engine fuel pressure to overcome the force of the spring 110 for the aforesaid purpose whenever the pilot's control lever is in any position except the "off" position. Thus, the jet engine can be operated with every assurance that a stop is provided to prevent the throttle valve from restricting fuel flow to a level which would cause engine failure.

When the power lever is placed in the off position and the fuel pump is de-energized, fuel flow will cease and pressure in the stop actuating chamber 114 will be dissipated whereupon the spring 110 will force the stop 94 out of operating position as shown in FIG. 3. Also, engine operation will cease and the parameters thereof will no longer maintain pressure in the throttle actuating chamber. As a result, the throttle valve spring will force the throttle valve against the fixed stop 92, as shown in FIG. 3, to set the stage for engine starting.

Accordingly, there is provided in accordance with the present invention a throttle valve which is reciprocable to adjust the effective area or size of at least one flow port therein and which during movement in one direction to restrict the effective size of the port will in any event engage a first stop to select a minimum fuel flow suitable for engine starting and which may also engage a selectively operable adjustable stop to fix a limit on fuel flow which is anticipated to prevent engine failure during aircraft flight, the metered flow fixed by the adjustable stop means being the minimum flow for most conditions of operation.

When starting the engine, the power lever is advanced from the off position, but this will not of itself move the throttle valve. It will, however, cause fuel flow through the throttle valve at the low minimum flow and establish fuel pressure in the conduit 22 and in the stop actuating chamber 114. This will urge the stop 94 toward operating position and cause its arm 96 to engage the side of the throttle valve projection 98. The throttle valve will move away from the "low" minimum stop 92 only after engine operation has been established and the parameters thereof establish pressure in the throttle valve actuating chamber 66 sufficient to overcome the force of the throttle valve spring 68. When the throttle valve has established flow in excess of the "high" minimum, the projection 98 will be moved below the stop arm 96 and the stop 94 will then snap into operating position.

Preferably, the stop spring 110 is provided in sufficient force to move the stop 94 out of operating position (as shown in FIG. 2) whenever the power lever is placed in the off position. That is, the spring 110 has sufficient force on the pivoted stop 94 to overcome the force of the throttle valve thereon for the purpose of moving the stop 94 out of the way so the throttle valve can move to the low minimum stop position.

The invention claimed is:

1. Means for controlling flow in a fuel supply conduit for an engine and comprising a throttle valve reciprocable generally transversely of the conduit and having a port accommodating fuel flow therein and so arranged that movement of the valve in one direction reduces the effective size of said port, a first stop engageable with the said valve during movement thereof in said one direction to provide for a first fixed minimum effective size of the said port for starting operation of the engine, and stop means for selectively engaging said valve during movement thereof in said one direction to provide for a second and larger fixed minimum effective size of the said port for self-sustaining engine operation, said stop means comprising a second stop which is movable into and out of position for engagement with the valve, means biasing said second stop out of position, and fluid pressure operated means connected with said second stop and with said conduit downstream of said valve and operable by fuel in said conduit to move said second stop into position when fuel pressure in said conduit increases to a level of self-sustaining engine operation.

2. Means for controlling flow in an engine fuel supply conduit comprising a valve housing, a throttle valve reciprocable in the housing generally transversely of the conduit and having a port accommodating fuel flow therein and so arranged that movement of the valve in one direction reduces the effective size of said port, a fixed stop in said housing engageable with said valve during movement thereof in said one direction to provide for a first fixed minimum effective size of said port for starting operation of the engine, and stop means selectively engageable with said valve during movement thereof in said one direction to provide for a second and larger fixed minimum effective size of said port for self-sustaining engine operation, said stop means comprising a second stop pivotally supported in said housing for movement into and out of position for engagement with the valve, means biasing said pivoted stop out of said position, and fluid pressure operated means connected with said second stop and with said conduit downstream of said valve and operable by fuel in said conduit to move said second stop into position when fuel pressure in said conduit increases to a level of self-sustaining engine operation.

3. Means for controlling flow in an engine fuel supply conduit comprising a valve housing having an inlet and an outlet in communication with said conduit, means responsive to pressure at said inlet and said outlet providing a substantially constant pressure differential therebetween, a throttle valve reciprocable in the housing generally transversely of the conduit and having a port accommodating fuel flow therein and so arranged that movement of the valve in one direction reduces the effective size of the said port, a first stop engageable with the said valve during movement thereof in said one direction to provide for a first fixed minimum effective size of the said port for starting operation of the engine, and stop means comprising a second stop for selectively engaging said valve during movement thereof in said one direction to provide for a second and larger fixed minimum effective size of the said port for self-sustaining engine operation, means biasing said stop means out of position, and fluid pressure operated means connected with said second stop and with said conduit downstream of said valve and operable by fuel in said conduit to move said second stop into position when fuel pressure in said conduit increases to a level of self-sustaining engine operation.

4. In a fuel control for a jet engine or the like, the combination of a throttle valve for controlling fuel flow which is biased toward closed position and which has a regulated pressure chamber wherein fluid pressure urges the valve toward open position, means responsive to at least one parameter of engine operation for establishing and regulating pressure in said chamber, a first stop limiting movement of said throttle valve toward closed position to provide for a fixed low minimum flow through the throttle valve for starting operation of the engine, and selectively operable stop means for limiting movement of said throttle valve toward closed position to provide for a fixed higher minimum flow therethrough for self-sustaining engine operation, spring means urging said stop means out of operative position for limiting throttle valve movement, and a fluid pressure operated piston connected with said stop means and with said conduit downstream of said valve and operable by fuel in said conduit to move said stop means into operative position for limiting throttle valve movement when fuel pressure in said conduit increases to a level of self-sustaining engine operation.

References Cited in the file of this patent
UNITED STATES PATENTS

| | | |
|---|---|---|
| 801,514 | Dexter | Oct. 10, 1905 |
| 2,422,808 | Stokes | June 24, 1947 |
| 2,634,086 | Johns | Apr. 7, 1953 |
| 2,641,105 | Drake | June 9, 1953 |
| 2,671,860 | Bevins | Mar. 9, 1954 |
| 2,673,556 | Reggio | Mar. 30, 1954 |
| 2,674,847 | Davies et al. | Apr. 13, 1954 |
| 2,707,866 | Noon et al. | May 10, 1955 |
| 2,774,414 | Machlanski | Dec. 18, 1956 |
| 2,795,929 | Hazen | June 18, 1957 |
| 2,796,733 | Pearl et al. | June 25, 1957 |
| 2,879,643 | Stroh et al. | Mar. 31, 1959 |
| 2,941,602 | Coar | June 21, 1960 |